(12) United States Patent
Svenningsen et al.

(10) Patent No.: US 10,946,983 B2
(45) Date of Patent: Mar. 16, 2021

(54) SYSTEM FOR HANDLING LUGGAGE AND A METHOD OF HANDLING LUGGAGE

(71) Applicant: BBHS A/S, Hedehusene (DK)

(72) Inventors: Ulrik Svenningsen, Valby (DK); Krisztian Griz, Taastrup (DK)

(73) Assignee: BBHS A/S, Hedehusene (DK)

( * ) Notice: Subject to any disclaimer, the term of this patent is extended or adjusted under 35 U.S.C. 154(b) by 0 days.

(21) Appl. No.: 16/645,592

(22) PCT Filed: Aug. 8, 2018

(86) PCT No.: PCT/EP2018/071546
§ 371 (c)(1),
(2) Date: Mar. 9, 2020

(87) PCT Pub. No.: WO2019/030303
PCT Pub. Date: Feb. 14, 2019

(65) Prior Publication Data
US 2020/0269994 A1  Aug. 27, 2020

(30) Foreign Application Priority Data
Aug. 8, 2017 (EP) ..................... 17185359

(51) Int. Cl.
*B64F 1/36* (2017.01)
*B64F 1/32* (2006.01)
*B65G 47/26* (2006.01)

(52) U.S. Cl.
CPC ............... *B64F 1/368* (2013.01); *B64F 1/32* (2013.01); *B64F 1/324* (2020.01); *B65G 47/26* (2013.01)

(58) Field of Classification Search
CPC .......... B65G 2210/0264; B65G 47/261; B65D 9/00; B64F 1/32; B64F 1/36; B64F 1/368; B64F 1/366; B64F 1/324
(Continued)

(56) References Cited

U.S. PATENT DOCUMENTS 3,610,159 A * 10/1971 Fickenscher ........... G07B 15/00
104/88.05
7,066,315 B2 * 6/2006 Tanaka ................. B65G 1/1373
198/349

(Continued)

FOREIGN PATENT DOCUMENTS

| DE | 102010020146 | 11/2011 |
|---|---|---|
| EP | 2655221 B1 | 2/2015 |
| WO | WO-2013/076349 | 5/2013 |

OTHER PUBLICATIONS

International Search Report PCT/ISA/210 for International Application No. PCT/EP2018/071546 Dated Sep. 21, 2018.
(Continued)

*Primary Examiner* — James R Bidwell
(74) *Attorney, Agent, or Firm* — Harness, Dickey & Pierce, P.L.C.

(57) ABSTRACT

A system and a manner of handling luggage items, such as in an airport where the luggage items are stored in a plurality of buffers, where the luggage items of one buffer are provided into one container which is configured for loading into and transport on airplanes. The luggage items may be sorted into the buffers so that e.g. high priority luggage items are stored in containers separate from containers holding lower priority luggage items.

16 Claims, 2 Drawing Sheets

(58) Field of Classification Search
USPC .................................... 198/347.1, 358, 349
See application file for complete search history.

(56) References Cited

U.S. PATENT DOCUMENTS

| | | | | |
|---|---|---|---|---|
| 7,575,112 B2* | 8/2009 | Lowes | ................... | B64F 1/368 |
| | | | | 198/349 |
| 9,457,917 B2* | 10/2016 | Dadyala | ................. | B64F 1/368 |
| 10,077,120 B2* | 9/2018 | Thogersen | ............ | B65G 65/02 |

OTHER PUBLICATIONS

Written Opinion of the International Searching Authority PCT/ISA/237 for International Application No. PCT/EP2018/071546 Dated Sep. 21, 2018.
Singaporean Search Report and Written Opinion dated Jan. 18, 2021 for corresponding Singaporean Application No. 11202002152U.

* cited by examiner

SYSTEM FOR HANDLING LUGGAGE AND A METHOD OF HANDLING LUGGAGE

CROSS-REFERENCE TO RELATED APPLICATIONS

This application is a national phase under 35 U.S.C. § 371 of PCT International Application No. PCT/EP2018/071546, which has an International filing date of Aug. 8, 2018, which claims priority to European Patent Application No. 17185359.1, filed Aug. 8, 2017, the entire contents of each of which are hereby incorporated by reference.

BACKGROUND

The present invention relates to a system and a method for handling luggage and in particular a compact and efficient manner of handling luggage targeted for a large airplane configured to receive a number of luggage containers designed and dimensioned for the airplane.

Historically, luggage handling has involved manual labour which wears the human body but also is costly, slow and error prone.

Luggage handling often comprises manual loading and unloading of airplanes. Manual loading and unloading of airplanes may be prevented using ULDs (Unit Load Devices) which are configured to receive luggage items therein and then be positioned in airplanes. However, manual labour is still often used in order to load and unload the ULDs.

Usually, loading of airplanes and/or ULDs is made with no particular sorting of the luggage.

SUMMARY

The present invention relates to a manner of preparing or pre-sorting luggage items so that they may easily and simply be provided in ULDs.

In a first aspect, the invention relates to a system for handling luggage, the system comprising:
  a luggage receiving portion (may be a conveyor belt) for receiving a plurality of luggage items,
  a luggage sorting system comprising a plurality of luggage buffers each for storing one or more of the luggage items, the luggage sorting system being configured to receive luggage items from the luggage receiving portion and provide each luggage item in a luggage buffer,
  a plurality of luggage containers each configured to
    receive a number of the luggage items,
    be positioned inside an airplane and
    be transported by the airplane,
  a luggage transporting element configured to transfer luggage items from a luggage buffer to a luggage container.

In this context, the system may be divided into a number of elements. Usually, however, the system is capable of transporting the luggage items automatically, such as without manual labour, at least in some of the handling routines. The system may comprise one or more scanners and/or other sensors or the like for tracking the positions, identities and/or other parameters of the luggage items handled. The system may be configured to determine a position of a luggage item once and thereafter determine, estimate or calculate the position of the luggage item on the basis of the transport thereof, such as the movement of a conveyor belt, so that the position of the luggage item need not be determined further along the conveyor belt, as the position may be calculated.

In some embodiments, the luggage receiving portion is at least one principal sorter conveyor for conveying the items to respective unloading positions along the principal sorter conveyor, each luggage buffer is a first item buffer section at each of the unloading positions, wherein each first item buffer sections comprises a plurality of first shelves for storing a plurality of the items on each shelf, each first shelf extending in a longitudinal direction from an inlet end of the first item buffer section to an outlet end thereof, and the sorting system comprises at least one directing apparatus at each unloading position for directing the items onto the shelves of the first item buffer section.

In this case, each first item buffer section may be used as a storage facility for items, such as airport luggage or parcels that are to be delivered to a luggage container at a later point in time, whereby each first item buffer section may be sequentially and effectively loaded over an extended period of time, such as one or several hours prior to, e.g., flight departure.

In present context, the term inlet end is to be understood as the end of the first item buffer section at which items enter the first item buffer section. Similarly, the outlet end is to be understood as the end of the first item buffer section at which items leave the first item buffer section. The inlet and outlet ends of each first item buffer section are preferentially arranged at opposite ends of respective first item buffer sections to ease the flow of items through each of the first item buffer sections. Preferably, the first item buffer sections are configured to allow items to be transferred, or to transfer items, from the inlet end to the outlet end of either one of the first items buffer sections without undergoing any directional change. Thus, the items are preferably transferable along a linear one-directional path from the inlet to the outlet end. Thereby, operational speed and structural simplicity of the system may be enhanced.

In present context, the term loading end of a shelf is to be understood as the end point of the shelf at which items are loaded onto the shelf. Similarly, the unloading end of a shelf is to be understood as the end point of the shelf at which items are unloaded from the shelf. The loading and unloading ends of a shelf are preferentially arranged at opposite ends of the shelf to ease the flow of items through each of the first item buffer sections. Preferably, each shelf is configured to allow items to be transferred, or to transfer items, from the loading end to the unloading end of the shelf without undergoing any directional change. Thus, the items are preferably transferable along a linear one-directional path from the loading end to the unloading end of the shelf. Thereby, operational speed and structural simplicity of the system may be enhanced.

In some embodiments, the luggage transporting element comprises a connecting conveyor extending along the respective outlet ends of the first item buffer sections and for receiving items unloaded from the first item buffer sections at their respective outlet ends for effective unloading of items at the respective outlet ends.

In some embodiments, the luggage transporting element comprises a connector conveyor assembly comprising an item conveyor and a connector unit for loading of luggage or parcel items to the connector item conveyor or unloading of luggage or parcel items from the connector item conveyor, the connector unit defining a connector unit conveyor surface, the connector conveyor assembly further comprising:

a rotation element for automated rotation of the connector unit relative to the connector item conveyor around an axis of rotation extending transversely to the connector unit conveyor surface;

a tilting element for automated tilting of the connector unit relative to the connector item conveyor;

at least one first actuator assembly connected to the connector unit and configured to at least effect automated rotation of the connector unit relative to the connector item conveyor around the axis of rotation; and a control unit for controlling the first actuator assembly.

In present context, the term "tilting" is to be understood as changing orientation in a vertical plane, such as, e.g., pivoting up or down. In present context, the term rotation is to be understood as rotation in a horizontal plane, such as, e.g., pivoting from side to side.

It will be appreciated that the ability of the connector unit to both tilt and rotate relative to the connector item conveyor may improve the efficiency of the luggage transporting element in the process of transferring items to or from an item container. This intern allows for minimization of the time it takes to load or unload a luggage container for efficient handling of luggage items. Also, quick loading and unloading of the luggage container allows for minimising the number of luggage containers being unloaded at any given point in time but loading and unloading the luggage containers in a sequential and efficient manner.

More particularly, because the connector unit is able to both tilt and rotate relative to the connector item conveyor, the connector unit is able to reach a larger range of locations without having to move the connector item conveyor, than if the connector unit did not have such capabilities. Particularly, when loading a luggage container, such as, e.g., a unit load device (ULD), the luggage or parcel items may have to be arranged in a specific order or manner. Without an automated conveyor assembly with at least one actuator causing automated rotation of the connector unit, a person would possibly have to reach for the designated location of each luggage or parcel item. Such repeated movements may be harmful for people and are avoidable thanks to the provisions of the automated rotation and tiling elements of the connector conveyor assembly of present embodiments.

In some embodiments, the connector unit comprises:

mutually displaceable first and second connector conveyor elements; and a supporting structure for supporting the first and second connector conveyor elements.

The mutually displaceable first and second connector conveyor elements may increase the versatility of the connector unit. The first or the second connector conveyor elements may be displaced away from the other connector conveyor element and away from the connector item conveyor. This allows the connecting unit to be readily extended. Similarly, the first or second connector conveyor element may be retracted to shorten the connector unit.

In one embodiment, the mutually displaceable first and second connector conveyor elements are configured to be mutually displaceable within vertically displaced planes. In one embodiment, the vertically displaced planes are parallel. This allows for a compact yet versatile configuration of the connector unit.

In embodiments, the method comprises the further step of selectively mutually displacing the first and second connector conveyor elements on the basis of a conveying direction of the first and second connector conveyor elements.

The first and second connector conveyor elements may be controlled to selectively mutually displaced on the basis of a conveying direction of the first and second connector conveyor elements. Moreover, if the first connector conveyor element is, e.g., arranged above the second connector conveyor element, and they are conveying items away from the connector item conveyor, the first connector conveyor element may preferably be controlled to be arranged closest to the item conveyor, while the second connector conveyor element is preferentially controlled to be arranged furthest from the connector item conveyor. In this case, it is ensured that when the item is being conveyed from the first to the second connector conveyor element, the item is allowed to move down from the first to the second connector conveyor element by way of gravity.

Other elements usually present in airports and luggage handling facilities is explosives detectors, drug detectors, x-ray scanners and the like for checking the luggage items before loading onto airplanes. Naturally, such other elements may also be provided in the present system.

Luggage may be luggage items, which usually are suitcases, bags or backpacks but also may be boxes and other goods for transport in airplanes. Often, luggage items are tagged with an identity tag and/or a tag describing the destination or transit airport of the luggage item. The luggage item may also have a unique number from which at least the destination airport or the flight may be determined.

The luggage receiving portion is the portion introducing the luggage into the system or at least the present portion of the system. Naturally, the luggage items may be provided to the luggage receiving portion in a number of manners. In one manner, luggage items received from a check-in area of the airport may be fed to the luggage receiving portion. Another storage facility may be provided for receiving luggage items for longer time storage. Thus, luggage items may be received from this storage facility when it is desired to populate the buffers for swift loading into the containers. Other sources of luggage items may be transit luggage received from containers transported to the airport and/or system by airplanes from other airports—where the luggage is destined for a third airport.

Naturally, the luggage receiving portion may be embodied in a number of manners. A single conveyor belt may be used. Alternatively, a larger and more complex system of conveyors or the like may be used for receiving the luggage items from e.g. multiple sources, for analysing/scanning the luggage items, diverting some luggage items for further analysis, feeding luggage items to another storage system for intermediate storage or the like.

Also, separate buffers or buffers in separate groups may receive luggage items from separate luggage receiving portions, if desired.

The luggage sorting system comprises a plurality of luggage buffers. Each buffer is capable of storing one or more of the luggage items. It may be desired that each buffer is capable of storing the same number of or amount of (volume, weight for example) luggage items as a container. Presently, each buffer preferably is capable of storing 30 standard suitcases.

A preferred manner of embodying a buffer is a FIFO-type (first in, first out) storage where received luggage items are received sequentially over time and stored in a linear fashion. In that manner, it is not required that all luggage items are received as an unbroken sequence of luggage items. Also, in that manner, the buffer may be embodied as e.g. a number of short conveyor belts so that when one luggage item is already stored at the output end of the buffer, the next luggage item may enter the input end and be transported along the buffer to the already stored luggage item—while allowing the already stored luggage item to remain at the output end of the buffer. Another manner of obtaining this is to have the first luggage item stop at the entrance of the buffer and to only move when the next luggage item is introduced therein. Thus, the buffer is full, when the first luggage item reaches the output end of the buffer.

Naturally, a number of other manners of storing luggage items in a FIFO-like manner may be used, such as a simple downwardly sloping slide where the output end is at the lower end.

Also, other types of buffer structures may be used. The luggage items may be piled on top of each other or simply collected in a defined space for later transport to the container.

The transport or transfer of the luggage items from the luggage receiving portion and into the buffers can be obtained on a number of manners. The buffers may be arranged in a single plane so that a simple pusher or vertical re-direction of the luggage items may suffice.

Preferably, however, the buffers are provided in a matrix pattern with columns and rows so that also a vertical movement may be required. Any number of rows and columns may be used, such as more than 10 columns, such as more than 20 columns and 1-20 rows, such as 2-10 rows, such as at least 3 rows, such as at least 4 rows. Thus, the transport from the luggage receiving portion to the buffer may be both a vertical and a horizontal movement of the luggage item.

The luggage containers may be the so-called ULDs which are today used for holding luggage items during flight and which makes loading and unloading of the aircraft easier, as one container may hold a large number of luggage items so that the loading and unloading may be a loading/unloading of fewer (but larger) elements which facilitates automated or machine aided loading/unloading. The containers may be self propelled or transported by e.g. a tractor pulling carts connected into a train.

Often the containers are shaped or dimensioned for a particular aircraft or aircraft type. Thus, the system may be set up so that the number or types of luggage items fed to each buffer takes into account the aircraft type and/or container type/size.

According to the invention, the luggage transporting element is configured to transfer luggage items from a luggage buffer to a luggage container, such as all luggage items from one buffer into the same container. In that manner, any desired pre-sorting of the luggage items has been performed, and the feeding into the containers is simple and swift. This transfer then may be automated at least to the degree that the only human intervention required is to actually position the luggage items inside the container.

Naturally, this luggage transporting element may be configured to feed the luggage items of a buffer directly to the container, such as when the luggage from one buffer or a separate group of buffers use only transporting elements (conveyor(s) and the like) reserved for that buffer/group. Alternatively, the luggage items may be fed to e.g. a conveyor common to some of or all buffers and therefrom to the container. In the latter situation, the luggage items from separate buffers may be fed to the common conveyor at different points in time.

In one embodiment, each luggage item is correlated with one or more parameters. Then, the luggage sorting system may be configured to determine a luggage buffer from the parameter(s) of a luggage item and provide the luggage item in the determined luggage buffer.

A large number of parameters may be used for this determination. One parameter may be a seating group or importance level of the owner or passenger. It may be desired to provide all priority passenger luggage into one or more separate containers. Priority passengers may be frequent flyers, first/business class travellers or the like. It may be desired to unload such luggage swiftly from the airplane and thereby not mix this luggage with the luggage of non-priority passengers.

Another parameter may be whether the luggage is destined for the destination airport of the flight onto which the container is to be transported. If not, the luggage item may have to travel further and thus be in transit only in the next airport. Transit passengers and luggage sometimes must reach the next flight swiftly, so it may be desired to have transit luggage provided in separate container(s) so that this may be unloaded swiftly from the airplane. The luggage items of non-priority passengers having the next airport as the final destination are usually assumed to not be in a hurry. This luggage often is handled with the least urgency.

Yet another parameter may be an association of the owner/passenger of the luggage item with other owner/passengers. It may be desired to ensure that the luggage items of families/groups are provided in the same container. In the situation where a member of a group/family does not show up at the gate, often the other members also do not show up—or decide to not take the flight. Then, the luggage items of that member or group is to be removed from the airplane. Having to unload only a single container facilitates this undesired process. The same is the situation if a passenger carries multiple luggage items. These preferably are provided in the same buffer and container.

In some instances, it is desired that a buffer is re-used as quickly as possible. In such situations, a buffer may be desired emptied no longer than 10 minutes from a point in time where it receives the first luggage item or where it is full.

In other instances, a buffer may be reserved for a longer period of time, such as the period of time from the starting of check-in for the flight, where the buffer is then emptied when it is desired to load the containers for that flight. Then, a buffer may be collecting luggage items over e.g. 2 hours or more.

A parameter may also relate to the nationality of the owner/passenger. This parameter may have to do with the amount of time which it is expected that the immigration process will take. Nationals of the destination country often have a swifter passage of the immigration or control instances in the destination airport. Also, unions or groups of countries exist which allow swifter passage of inhabitants of these countries than visitors from outside of the group of countries. One such union is the signatories of the so-called "Schengen treaty". Thus, it may be desired to transfer luggage items of such passengers into specific containers and the luggage of passengers from outside such countries in other containers and then unload the Schengen passengers' containers first, as they will be expected at the baggage claim area swifter than the non-Schengen passengers in a Schengen signatory airport.

Another parameter may be the weight of the luggage item. It may be desired to ensure that no containers become too heavy or that a fully loaded container has a total weight within a desired range. Knowing the weight of the luggage items makes it possible to distribute the luggage items in the containers (via the buffers) to obtain this.

Yet another parameter may be the size, volume, dimensions, or shape of the luggage items. Systems exist which are capable of stacking or packing items of known shapes/dimensions to obtain the most efficient utilization of a known space. This process may also be used in order to provide as many luggage items as possible within a container. When the system knows which luggage items have already been buffered in a buffer, a next luggage item may be analysed and a determination may be made whether that luggage item may be provided in that container or whether it must be fed to another container and thus another buffer.

In one embodiment, the luggage sorting system is configured to provide luggage items with the same parameter(s) in the same luggage buffer. This is often the situation, when the parameter relates to the owner/passenger or the destination of the luggage item. For example, the parameter may be a seating group, priority, relation of the owner to owners of other luggage items—or whether the luggage item is transfer luggage at the next airport.

As mentioned, one of the parameters may be a weight of the luggage item. Then, the luggage sorting system may be configured to determine a luggage buffer, so that all luggage items provided to the luggage buffer have a combined weight within a predetermined weight interval.

Naturally, when a buffer becomes full, which is reserved for a particular type of luggage items, such as luggage items for a particular flight and optionally also for such luggage with any of the above parameters, another buffer may be used for the same type of luggage items. Any number of buffers may be reserved for the same parameters.

Then, when it is time to load the containers, some buffers may hold fewer luggage items than a container can hold. In that situation, the container may be only partly filled and put on the airplane. Alternatively, luggage items from another buffer may be fed to the container.

Thus, in one embodiment, the luggage transporting system is configured to transfer luggage items from two or more luggage buffers to the same luggage container. If there are no more luggage items or buffers with the same parameter or parameters, luggage items from another buffer with other parameters may be used (preferably, however, the luggage is for the same flight, even though luggage for airport X could in principle be forwarded to a direct flight even though the passenger has a ticket for airport X via airport Y).

For example, if a container with priority luggage is not full, non-priority luggage items may be used for filling the container. This may simply mean that some non-priority passengers get their luggage swifter.

In one embodiment, as is described above, each luggage item is correlated with an identity where the system is configured to generate a record, for one or more of the luggage containers, of the identities of the luggage items provided in the particular luggage container.

In this situation, the identity may be an identity of the luggage item or of an owner/passenger. In this manner, the luggage of a particular person or group of persons may easily be accessed, as the record will describe in which container this luggage may be found.

In one embodiment, the luggage transporting element is configured to transfer each luggage item from each luggage buffer to the luggage containers without an intermediate storage. When the luggage items have been sorted into the buffers, it is preferred that they are not mixed again but are directly transported into the container(s). Thus, in one embodiment, the luggage items of a buffer are transported to a container in an unbroken sequence all the way. The luggage items may be sequentially transferred using a transporting element reserved for that buffer and/or container or a common transporting element which then is not used for luggage items of other buffers, before all luggage items of a buffer have been fed to a container.

Another aspect of the invention relates to a method of handling luggage, the method comprising:
receiving a plurality of luggage items,
providing each luggage item in one of a plurality of luggage buffers, and,
transferring luggage items from a luggage buffer into a luggage container configured to be positioned in and transported by an airplane.

In this context, the receiving step may comprise receiving the luggage items from a number of sources, such as from one or more of check-in counters in an airport, a storage facility, other luggage item receiving elements, containers unloaded from other airplanes or the like.

As mentioned above, the receiving step may comprise receiving luggage items stored in a storing facility. It is preferred that luggage items are not stored in a buffer for an extended period of time.

In fact, the receiving step may comprise initially receiving the luggage items and storing these in a storing facility and subsequently transferring these to the buffers. Then, the transfer to the buffers may be initiated when all luggage items for e.g. a particular flight or a particular container have been received. Alternatively, the transfer to the buffers may be initiated at a predetermined point in time before take-off or the desired loading time of a particular airplane, where the luggage items for that airplane are transferred to the buffers and then loaded into the containers.

It may be desired that the buffers are emptied as swiftly as possible, so that the luggage items are preferably not provided in the buffers, until the containers are available for receiving the luggage items from the buffers. In this manner, the buffers are re-used as frequently as possible.

Also, it may be desired to not load the containers, until these may be transported to and loaded on to an airplane. In that manner, loaded containers do not take up space in the airport. Also, loaded containers simply be stored in an airport will require a larger total number of containers compared to when the containers are either always on an airplane or being moved to/from an airplane or being loaded/unloaded.

It may be determined already when the luggage items are stored in the buffers that a luggage item is to be removed, such as if a person did not show up at the gate. For that reason, the system may comprise an element configured to unload a buffer and re-introduce some of the luggage items back into the buffer. This element may feed the luggage items back to the luggage receiving portion for it to return the luggage items to the luggage sorting system. Then, somewhere along the line, the luggage item desired removed may be identified and output from the system or provided to another buffer relating to e.g. a flight to which the pertaining passenger has been assigned.

A luggage item may be provided in a luggage buffer in any desired manner. Handling and transport of luggage items is an old technology and may comprise the use of endless conveyor belts, transport on trays, roller floors or the like. Preferably, a buffer is a linear or oblong storage holding the luggage items in a sequence. When the providing step comprises buffering the luggage items in a buffer in a space optimized fashion, it is desired that there is only a minimal (if any) distance between stored luggage items of a buffer. Thus, a luggage item presently introduced into a buffer already holding another luggage item may comprise actually moving the "new" luggage item in relation to the "old" luggage item. One manner of obtaining this is to store each luggage item on its own tray where the trays are movable independently of each other. In another situation, the buffer is embodied as a number of short conveyor belts movable in relation to each other so that a luggage item may be transported along the buffer toward an already stored luggage item in the buffer. The above structure where the luggage items stay at the entrance end of the buffer and only move when the next luggage item is introduced may alternatively be used.

Naturally, other buffer types and structures may be used, such as vertical stacking of the luggage items or using less structured storing mechanisms.

As mentioned above, the transferring step may comprise manual loading of the containers or an automated loading. A separate loading step and facility may be provided for each buffer or for separate groups of buffers. Alternatively, a shared loading facility may be provided where containers are sequentially loaded and buffers thus sequentially emptied.

When all luggage items of a buffer are loaded into the same container, the loading of the containers is simple and swift. Usually, the luggage items will be received in a random order but are desired provided to the containers in a particular order or at least in an order different from a random order. Thus, a pre-sorting of the luggage items is possible. A filled buffer may be emptied as soon as it is full (or when no more luggage items are available for that buffer). Loading of a container thus may comprise moving the container to a loading position and loading it by moving all luggage items from a buffer into the container. Thus, the loading hardware is not blocked by a partly filled container awaiting receipt of additional luggage items.

Subsequent to the transferring step, the containers may be transported to and loaded on to an airplane.

In one embodiment, each luggage item is correlated with one or more parameters, where the luggage sorting system determines a luggage buffer from the parameter(s) of a luggage item and provides the luggage item in the determined luggage buffer.

As mentioned above, parameters may relate to the passenger/owner and/or to the piece of luggage itself. A parameter may be related to a priority of the luggage item and/or the passenger/owner at the destination airport. It may be desired to provide more urgent luggage items in particular containers and to have such containers unloaded from the airplane first. Urgent luggage items may belong to transit passengers who may be in a hurry at the airport to get to a next flight. Delaying the luggage of such passengers may be expensive for the airline, so urgent handling may be desired.

Also, urgent luggage may belong to priority passengers, such as first/business class passengers and frequent flyers.

Less urgent luggage may belong to coach passengers having the destination airport as their final destination airport.

At airports, immigration checks may be performed. Often, nationals of the actual country have a swifter pass through such checks, as may nationals from neighbouring countries with which the country has immigration agreements (such as the signatories to the Schengen treaty). Thus, the nationality of the passengers may be a parameter, and luggage items belonging to passengers with the destination airport as their final destination and being nationals of that country (or countries having an immigration agreement with that country) may be provided in buffers/containers separate for other passengers with the same final destination airport but who are not nationals of such countries.

Another parameter may be a correspondence of a luggage item with other luggage items. Thus, luggage items belonging to the same person/passenger may be provided to the same buffer and container, as may luggage belonging passengers of the same family or other group travelling together. In this manner, if the person or group/family does not show up at the gate, a single container may need to be unloaded from the airplane in order to remove the luggage items of this person/group/family.

Yet another parameter may be the weight of the luggage item. It may be desired that the total weight of a container is below a limit, within a particular weight interval or simply known. If the weights of the containers are known, the loading into the airplane may be performed so as to balance the airplane.

If a maximum weight is to be observed or a weight is desired within an interval, the other parameters of the luggage item (if multiple parameters are use in the determination) may make it possible to feed the luggage item to one of multiple buffers, so that the weight may determine which buffer to provide the luggage item to. If the weight of the luggage item makes the luggage item not desired in any buffers already holding luggage items, the luggage item may be provided in a new buffer.

Yet a parameter may be dimensions/size/volume of the luggage item. Systems exist which are able to determine how to position objects with known dimensions inside a space with known dimensions. Thus, knowing e.g. the dimensions of the luggage items, it may be decided whether there is space in a buffer (or rather in the container into which the buffer is unloaded) for a particular luggage item. If so, the luggage item may be fed to that buffer. If not, the luggage item may be fed to a new buffer or another buffer.

The method thus may have the step of correlating one or more parameters to a luggage item. Today, luggage items are tagged before feeding into the baggage handling system. The tags are often bar codes, but other methods could be used, such as RFID tags or the like.

The tag or information may be a unique (at least for that particular day, airport or the like) number from which other parameters (such as destination airport, passenger ID or the like) may be derived from a database. The above parameters thus may be attached to or at least correlated to the luggage item at or before check-in. The weight of the luggage item and the identity of the passenger, the nationality of the passenger, the priority level, whether the passenger is in transit at the next airport, as well as the destination airport are all checked at check-in.

A tag may then be attached to the luggage item and read at another position in the system in order to determine the parameter(s) and act thereon.

A luggage item may be provided with a built-in RFID tag or bar code display which is adaptable to output the correct signal or show the correct bar code if programmed in advance, such as at check-in.

Other parameters may be determined at any point in time, such as after receiving of the luggage item, such as weight and dimensions of the luggage item. Scanners, scales and the like are widely known for this purpose.

In one situation, the luggage sorting system provides luggage items with the same parameter(s) in the same luggage buffer. This could be the situation for transit luggage, priority luggage and/or luggage belonging to the same person/group/family.

In one situation, as described, one of the parameters is a weight of the luggage item, and the luggage sorting system determines the luggage buffer, so that all luggage items provided to the luggage buffer have a combined weight within a predetermined weight interval.

In one embodiment, the luggage transporting system transfers luggage items from two or more luggage buffers to the same luggage container. It may not be desired to allow only partly filled containers—or at least to limit the number of such containers. Instead, it may be desired to allow multiple buffers to unload their luggage items into a common container. In this manner, luggage items may be "mixed", but this may be done so that e.g. lower priority luggage items or less urgent luggage items may be provided to a higher priority or more urgent container, where the container then is handled in accordance with the highest priority or most urgent luggage item therein.

Naturally, the other parameters may be taken into account as described above.

In one embodiment, as described above, each luggage item is correlated with an identity, the method comprising the step of generating a record, for one or more of the luggage containers, of the identities of the luggage items provided in the particular luggage container.

This identity may be related to an owner of the luggage item, such as a social security number, passport number, name or the like. Alternatively or in addition, the identity may relate to the luggage item, such as a unique number from which other information, such as destination, flight number, seating class etc. may be derived.

In one embodiment, the luggage transporting element transfers each luggage item from each luggage buffer to the luggage containers without an intermediate storage.

A predetermined number of the luggage items may be accumulated in one or more of the plurality of luggage buffers before the luggage items are transferred into the luggage container. Thus, for example, the luggage container may be at a remote position and moved to a position in the vicinity of the luggage buffers at a point in time, at which the predetermined number of luggage items have accumulated in the buffer. Utilization of the luggage container may thus be maximized. The predetermined number of the luggage items may preferably be sufficient to fill the luggage container to a predetermined level. In other words, the accumulated weight and/or volume of the luggage items may be within a predetermined range or above a predetermined threshold level.

As described above, it is preferred that the buffers for e.g. a flight or a predetermined number of containers, or at least for one container, is/are populated and then emptied as swiftly as possible. Then, the same buffer may immediately be re-used for collecting luggage items for another container.

The use of the buffers may be a pre-sorting of the luggage items which will often be received in an order different from the order in which the luggage items are provided to the containers. In one situation, the buffers are emptied sequentially into a sequence of containers. Thus, the luggage items for a container are preferably transported from the buffer to the container in an unbroken sequence. Usually, the luggage items will be received by the receiving means in a random order.

The containers and thus buffers related to a particular flight may begin population when all luggage items for that flight are available (such as present in another storage system) and/or at a point in time before the take-off of the flight and/or when the containers for that flight are available.

Preferably, the loading of all luggage items for a flight is performed by populating the buffers and then as soon as possible unloading the buffers into the containers. Naturally, filled buffers may be unloaded into containers while luggage items are received for other, still not filled buffers. It is not required to fill all luggage items into buffers before commencing with unloading into the containers.

As the luggage items are now sorted and ready for unloading into the containers, there is no need for intermediate storing between the buffers and the containers, so it is preferred that the luggage items of a buffer are fed directly and without delay into a container. It is noted that the loading may comprise a delaying step, such as if a container is not yet available or if the luggage items are fed from the buffer at a higher pace than the actual loading into the container. This is not seen as an intermediate storing.

Another aspect of the invention relates to a system for handing luggage items and comprising:
- a plurality of first buffers,
- a plurality of second buffers,
- a luggage item receiving element configured to receive luggage items and provide each luggage item to one of the first buffers, and
- a transferring element configured to transfer each luggage item of a first buffer into a second buffer.

In this context, the luggage items may be as those described above. The first buffers may be as those described above.

The receiving element may be as that described above.

The transferring element and the receiving element may be the same element or have a common element so that luggage items unloaded from a first buffer may be fed back into a first buffer. In this manner, the luggage items of the first buffers may be re-arranged or some luggage items thereof may be fed to the second buffers and others re-introduced into the first buffers.

Naturally, the second buffers may be arranged as described above, where they are configured to unload their luggage items to containers.

The first buffers may be similar so that a second buffer may be made a first buffer by altering only the operation thereof.

Naturally, this aspect may be combined with any of the above aspects so as to obtain the advantages of the above aspects.

The loading of the luggage items into the first buffers may be made in any desired manner.

Interesting manners and methods are described further below.

A final aspect of the invention relates to another method of handling luggage items, the method comprising:
- initially receiving a plurality of luggage items,
- storing each received luggage item in a first buffer of a plurality of first buffers,
- unloading the luggage items of a first buffer and transferring at least one of the luggage items to one of a plurality of second buffers.

The unloading step may comprise feeding each unloaded luggage item to either a first or a second buffer.

The storing in and the operation of the second buffers may be as described in relation to the first aspect of the invention.

The first buffers may be used as an intermediate storage and may thus receive luggage items before feeding to the second buffers for transport to the containers. Thus, the storing policy used in the first buffers may be less stringent than what is preferred in relation to the second buffers.

The first buffers may receive the luggage items in a random order and may feed the luggage items into randomly selected first buffers. Alternatively, the luggage items may be stored in relation to parameters thereof, such as which flight they are to take, which priority they have, at which point in time, within which time interval take-off is estimated, or the like.

It may be recorded which luggage items are in which first buffers so that, when particular luggage items are desired in the second buffers, the first buffers comprising such luggage items may be unloaded and the desired luggage items fed to the second buffers. Any remaining luggage items may be fed back into the first buffers.

Also, the luggage items of the first buffers may be re-arranged by being unloaded and fed back into the first buffers in with a new structure or order. Thus, if luggage items for several flights are originally fed into a first buffer, the first buffer may be emptied and the luggage items fed back to multiple first buffers—one for each flight. Then, when the second buffers are desired populated, only the first buffers for the particular flight or with other desired parameters need be unloaded.

BRIEF DESCRIPTION OF THE DRAWINGS

In the following, preferred embodiments of the invention are illustrated, where.

DETAILED DESCRIPTION

Figure 1:
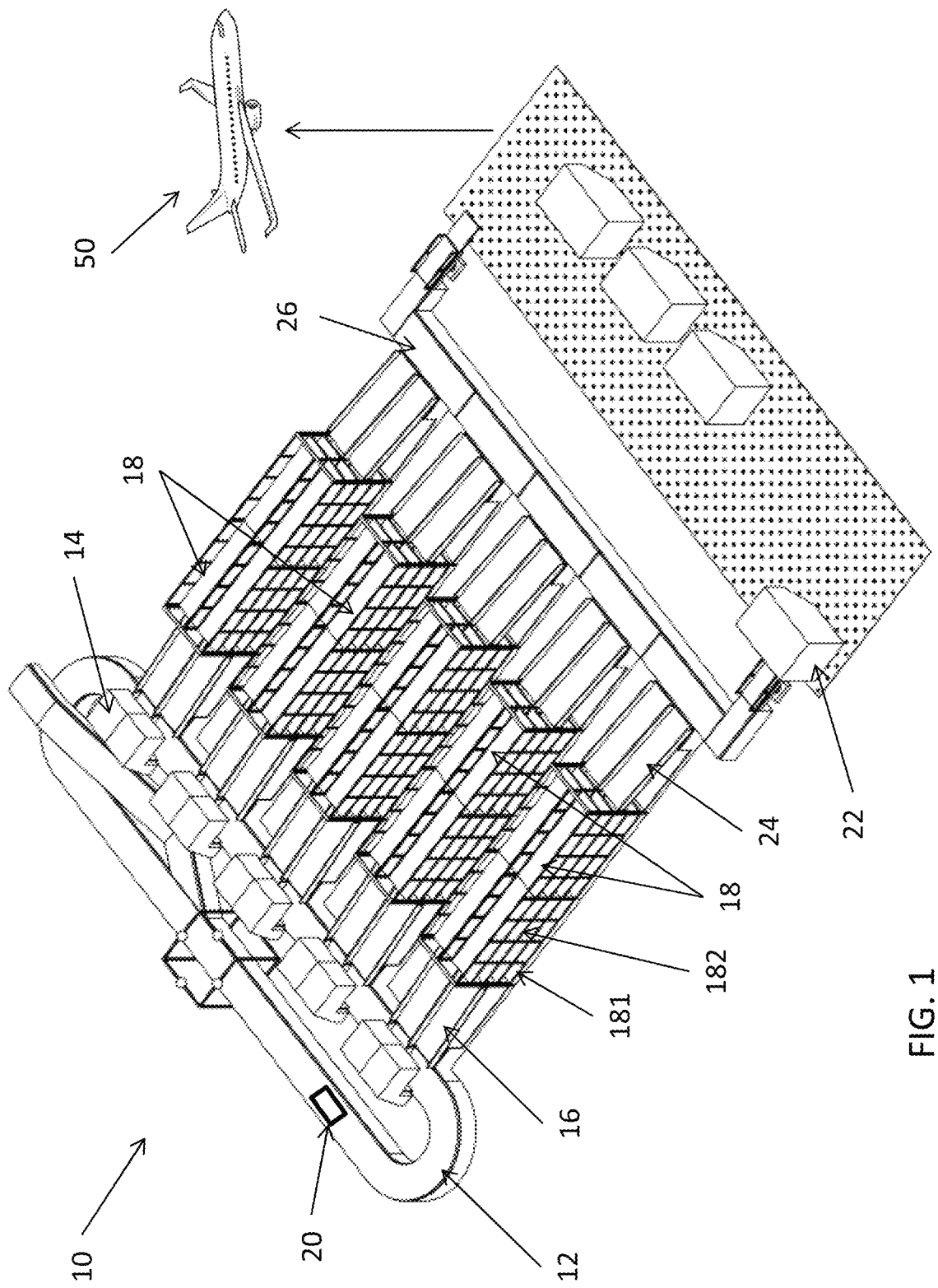
FIG. 1 illustrates a first embodiment of the invention and
FIG. 1 illustrates a second embodiment of the invention.

In FIG. 1, a baggage or luggage handling system 10 according to a first embodiment of the invention is illustrated. The luggage items 20, such as suitcases, enter the system on a conveyor belt 12, such as from a number of reception desks (not illustrated) in an airport. Naturally, this system may have the usual elements, such as identity scanners, content scanners and the like. The belt 12 may be constituted by a number of belts and may receive luggage from a number of sources.

A number of pushers 14 are provided for transferring luggage items from the belt 12 and onto an element 16 further transporting the luggage item to a buffer 181 or 182 of a shelf element 18 presently illustrated as having 5 buffers. Each buffer 181/182 is configured to hold a number of luggage items. The buffer 181/182 may be configured in any manner. Preferably, the first luggage item is provided at the entrance end of the buffer. When the next luggage item arrives for the buffer, it is introduced into the buffer while the former item(s) is/are moved toward the output end. In this manner, the items in the buffer extend from the entrance end and the buffer is full, when the first item reaches the output end.

Another manner of obtaining a linear buffer is to have a number of short conveyor belts, so that the luggage items of the buffer may be received over time but still be buffered with only a short distance between them. Thus, when a buffer already holds one luggage item, a next luggage item may be received in the buffer and transported, independently of the first luggage item, along the buffer to a position close to the first luggage item—without having to move the first luggage item out of the buffer.

Luggage items 20 buffered in a buffer 181/182 are subsequently unloaded and transferred to a container 22, such as using an unloading element 24 and another conveyor 26. All luggage items of one buffer are fed to the same container.

In this manner, the loading of the containers is facilitated, as the sorting of the luggage items into those destined for a particular container may be made on beforehand.

After loading, the containers 22 are transported to and provided inside an airplane 50 inside of which the containers and the luggage items are transported to another airport. In FIG. 1, a roller floor is provided transporting the containers from left to right and having a number of loading positions where empty containers are positioned to be loaded. Once loaded, the containers are moved away from the loading position and into a transport lane transporting loaded containers toward a facility loading the containers onto carts for transport to the airplane.

However, a number of situations make it desirable to load the containers in a specific manner. In one situation, it is desired to load all luggage items of priority passengers in separate containers, so that such containers may be unloaded first from the airplane. In other situations, it may be desired to load all luggage items for passengers in transit in the next airport into separate containers, as this luggage it not to be fed to a luggage reclaim area but rather fed into the luggage handling system of the new airport for delivery to another airplane.

In yet another situation, it may be desired to ensure that luggage belonging to e.g. family members or other groups is fed to the same container, as only a single container may be involved, if the family or group do not show up at the gate, so that the luggage items belonging to the participants of the group/family must be identified and removed from the container.

It is noted that all buffers 181/182 of all shelves 18 may be loaded individually. The system may determine into what buffer to load a luggage item, and thus into what container that luggage item goes, a number of manners.

Naturally, luggage items for many containers and many airplanes may be stored in the buffers at any point in time, but all luggage items of a buffer are fed to the same container.

When transporting the luggage items on the belt 12 and into the buffers, the system may track the luggage items to know where the luggage item is, so that the pushers 14 etc. may operate correctly to feed the luggage item to the correct buffer.

The system may feed the luggage items to a buffer determined in a number of manners. In one manner, all luggage items of priority passengers (frequent flyers, first class, business class and the like) are fed into specific buffers and thus containers.

In another situation, the luggage of transit passengers may be provided in particular containers, as they may be destined for another part of the arrival airport than passengers having that airport as the final destination.

In general, the airplane may be loaded, with the containers, in a particular manner so that e.g. the transit luggage may be swiftly unloaded from the airplane in order to not delay such passengers' arrival at the next airplane.

In one situation, the weight of the luggage items may be known, such as when determined at the check-in. Then, the weight of the individual containers may be known, and the luggage items may be divided between containers in order to ensure that all containers have a total weight within a desired weight interval or below a limit. In another situation, the containers may be loaded onto the airplane in a manner taking their weight into account in order to e.g. balance the airplane.

It may also or alternatively be desired to log an identity of each luggage item transferred into a container. This identity may be a serial or luggage number of a luggage item (as seen from the bar code fixed to each luggage item) or an identity of the owner or passenger. Logging the identity of the container and the identity of the luggage items therein will facilitate the removal of such luggage items from the container and the airplane, if the passenger does not show up at the gate after check-in. In this situation, it may even be advantageous to ensure that the luggage of all participants of a family of group is provided in the same container, in the situation where more or all participants of that family/group do not show up.

Figure 2:
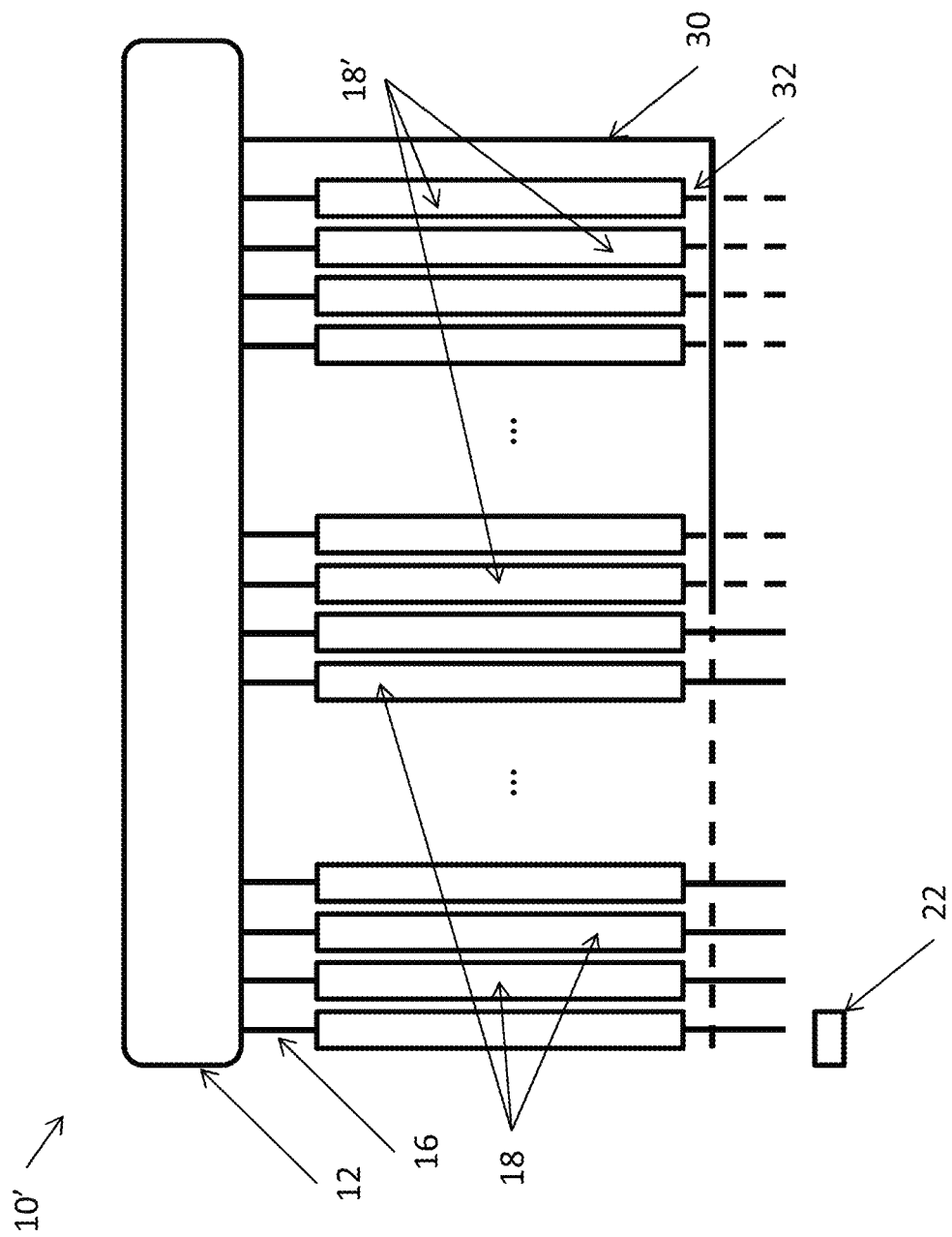

In FIG. 2, another system 10' according to the invention is illustrated, which has the conveyor belt 12 but from which a number of the elements of FIG. 1 have been removed to enhance clarity.

A number of shelves 18 are illustrated as are the elements 16 feeding (the pushers of FIG. 1 are not illustrated) the luggage items into the buffers (not illustrated). The unloading elements 24 are also illustrated but in this embodiment, the unloading takes place directly into the containers 22.

In addition to the shelves 18, additional shelves 18' are illustrated. These shelves 18' are not used for unloading into containers but instead for storing luggage items and subsequent unloading of the stored luggage items onto another belt 30, using unloaders 32, to feed the luggage items back to the belt 12.

The reason for this is that it may be desired to populate the buffers 181/182 of the system of FIG. 1 only a short time before wanting to load the luggage items into the containers for transport to the airplane. In this manner, the number of buffers and shelves may be kept to a minimum, as they are only populated shortly before unloading.

However, luggage items may be received by the belt 12 long before it is desired to load them into the containers. Thus, the system needs a storage for such luggage items for the time period between receipt and loading into the buffers for loading into the containers.

In relation to FIG. 1, this long time storage may be another element not illustrated which receives the luggage items and feeds these to the belt 12 only when they are desired in the buffers.

In FIG. 1, some of the shelves, namely shelves 18', and thus the buffers thereof, are used for a long time or intermediate storage of luggage items. Thus, the luggage items, which are not yet desired in the buffers for loading into the containers, may be fed to the other shelves 18' for storing until further notice. When it is time for feeding into the buffers for loading into the containers, the luggage items stored in shelves 18' are fed back to the belt 12 and thus to the shelves 18 and then handled as described in relation to FIG. 1.

When the long time storage takes place in a number of buffers (of the shelves 18'), the luggage items to be stored there may again be divided into desired groups and then fed into a desired buffer of a shelf 18'. When a large number of such buffers exist, one buffer may initially be reserved for luggage for a particular flight. When this buffer is full, another may be populated with later received luggage items for that flight.

Alternatively, a buffer may receive luggage for flights with scheduled take-off in a particular point in time or within a particular time interval.

It may be desired to actually re-arrange the storing structure of the buffers in the shelves 18', if a number of buffers become populated with luggage for a too large number of flights for example or for too many priorities or the like for the same flight. Then, such buffers may be unloaded to the belt 12 and the luggage items re-stored in the shelves 18' according to a new schedule, such as one where buffers are reserved for individual flights.

For example, if all luggage items with scheduled take-off between 2 and 3 PM are originally stored in one buffer and then into multiple buffers, as the number of luggage items increases, so that e.g. 30 buffers now hold such luggage items, such luggage items may be re-introduced on to the belt 12 and re-fed into buffers (may be the same physical buffers—now emptied—of the shelves 18') now each reserved for a single flight. In this manner, when a flight is imminent, the buffer(s) with luggage items for that flight may unload the luggage items to the belt 12, where after these luggage items may be received by the buffers 18 for loading into the containers.

The highly modular set-up of the system even makes it possible to use some buffers of one shelf 18/18' for long time storage and others for holding luggage items for the containers.

Also, it is possible to alter the function of a buffer or shelf 18/18', as an unloading element 24 may be provided for each shelf 18/18' as well as an element for transferring luggage items from that shelf 18/18' to the belt 30. Thus, of a larger intermediate storage is desired, a shelf 18 may be instead used as a shelf 18'- and vice versa.

Alternatively, unloading elements 24 may be provided only for some of the shelves 18 and an element for transferring luggage items to the belt 30 only for the other shelves.

Naturally, the conveyor 30, instead of feeding the luggage items unloaded from the buffers in the shelves 18' back to the conveyor 12, may feed such luggage items to the buffers in the shelves 18 in another manner, such as via the elements 16 or similar elements transferring luggage items from the conveyor 30 into the buffers of the shelves 18.

The invention claimed is:

1. A system for handling luggage, the system comprising:
a luggage receiving portion for receiving a plurality of luggage items,
a luggage sorting system comprising a plurality of luggage buffers each for storing one or more of the luggage items, the luggage sorting system being configured to receive luggage items from the luggage receiving portion and provide each luggage item in a luggage buffer,
a plurality of luggage containers each configured to
receive a number of the luggage items,
be positioned inside an airplane, and
be transported by the airplane,
a luggage transporting element configured to transfer luggage items from each luggage buffer to a luggage container,
a conveyor belt, and
at least one transferring element configured to transfer luggage items from the luggage buffer to the conveyor belt the conveyor belt being configured to transport luggage items from an unloading element to the luggage receiving portion.

2. A system according to claim 1, wherein each luggage item is correlated with one or more parameters, where the luggage sorting system is configured to determine a luggage buffer from the parameter(s) of a luggage item and provide the luggage item in the determined luggage buffer.

3. A system according to claim 2, wherein the luggage sorting system is configured to provide luggage items with the same parameter(s) in the same luggage buffer.

4. A system according to claim 2, wherein one of the parameters is a weight of the luggage item, and wherein the luggage sorting system is configured to determine a luggage buffer, so that all luggage items provided to the luggage buffer have a combined weight within a predetermined weight interval.

5. A system according to claim 1, wherein the luggage transporting element is configured to transfer luggage items from two or more luggage buffers to the same luggage container.

6. A system according to claim 1, wherein each luggage item is correlated with an identity and wherein the system is configured to generate a record, for one or more of the luggage containers, of the identities of the luggage items provided in the particular luggage container.

7. A system according to claim 1, wherein the luggage transporting element is configured to transfer each luggage item from each luggage buffer to the luggage containers without an intermediate storage.

8. A method of handling luggage, the method comprising:
receiving a plurality of luggage items at a luggage receiving portion,
providing each luggage item in one of a plurality of luggage buffers,
transferring luggage items from a luggage buffer into a luggage container configured to be positioned in and transported by an airplane, and
transferring luggage items from the luggage buffer to a conveyor belt transporting the luggage items to the luggage receiving portion.

9. A method according to claim 8, wherein each luggage item is correlated with one or more parameters, where the luggage sorting system determines a luggage buffer from the parameter(s) of a luggage item and provides the luggage item in the determined luggage buffer.

10. A method according to claim 9, wherein the luggage sorting system provides luggage items with the same parameter(s) in the same luggage buffer.

11. A method according to claim 9, wherein one of the parameters is a weight of the luggage item, and wherein the luggage sorting system determines the luggage buffer, so that all luggage items provided to the luggage buffer have a combined weight within a predetermined weight interval.

12. A method according to claim 8, wherein the luggage transporting system transfers luggage items from two or more luggage buffers to the same luggage container.

13. A method according to claim 8, wherein each luggage item is correlated with an identity, the method comprising the step of generating a record, for one or more of the luggage containers, of the identities of the luggage items provided in the particular luggage container.

14. A method according to claim 8, wherein the luggage transporting element transfers each luggage item from each luggage buffer to the luggage containers without an intermediate storage.

15. A method according to claim 8, wherein a predetermined number of the luggage items is accumulated in one of the plurality of luggage buffers before the luggage items are transferred into the luggage container, and wherein the predetermined number of the luggage items is sufficient to fill the luggage container to a predetermined level.

16. A system for handling luggage, the system comprising:
a luggage receiving portion for receiving a plurality of luggage items;
a luggage sorting system including a plurality of luggage buffers each for storing one or more luggage items of the plurality of luggage items, the luggage sorting system being configured to receive luggage items from the luggage receiving portion and provide each luggage item in a luggage buffer;
a plurality of luggage containers each configured to
receive a number of the luggage items,
be positioned inside an airplane, and
be transported by the airplane; and
a luggage transporting element configured to transfer luggage items from each luggage buffer to a luggage container, the luggage transporting element comprising an unloading element for each luggage buffer and a conveyor belt configured to receive luggage items from all unloading elements and transport luggage from each of the unloading elements to a loading position for loading the luggage into the luggage container.

* * * * *